Sept. 5, 1961  H. A. SPERO  2,998,610
SUNGLASSES
Filed Dec. 8, 1959  2 Sheets-Sheet 1

INVENTOR.
HAROLD A. SPERO
BY Sanford Schnurmacher
ATTORNEY.

Sept. 5, 1961
H. A. SPERO
2,998,610
SUNGLASSES
Filed Dec. 8, 1959
2 Sheets-Sheet 2
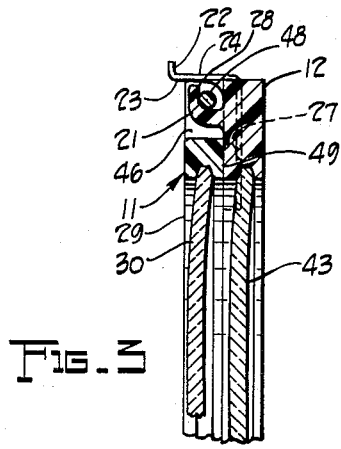
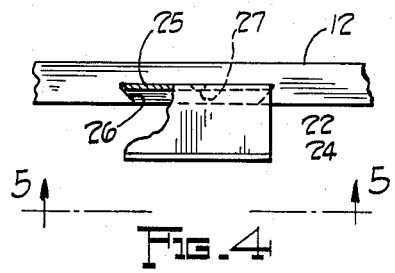
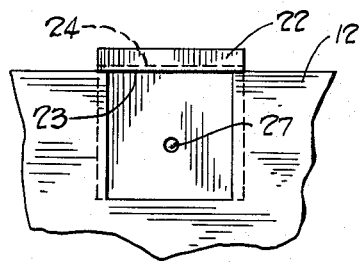
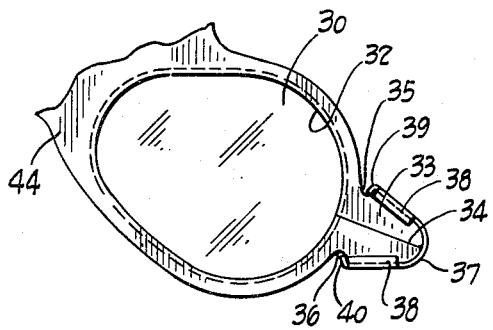
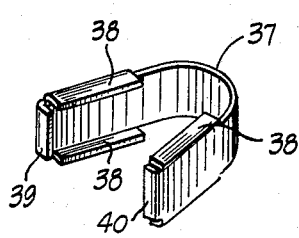
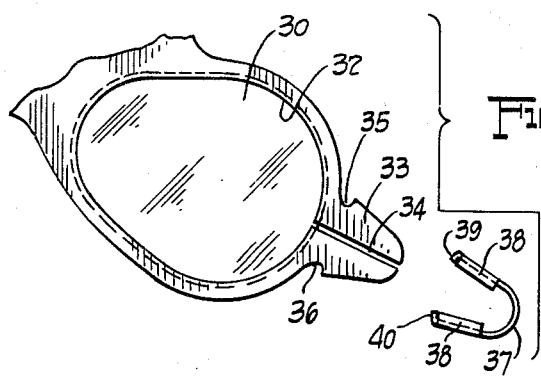
INVENTOR.
HAROLD A. SPERO
BY
ATTORNEY.

United States Patent Office 2,998,610
Patented Sept. 5, 1961

2,998,610
SUNGLASSES
Harold A. Spero, 19149 Fairmount Blvd.,
Shaker Heights, Ohio
Filed Dec. 8, 1959, Ser. No. 858,183
3 Claims. (Cl. 2—13)

This invention relates in general to certain new and useful improvements in sunglasses.

Conducive to a better understanding of this invention it may be well to point out that certain out-of-doors games, such as base-ball, require that the players operate under lighting conditions of widely varying contrast.

During the day-time certain of the players have playing positions wherein they work with their backs to the sun while at other times they must field balls directly into the sun. Similarly, the playing of night games, under stadium lights, poses problems of shadow and glare depending upon whether the player is looking downward at the playing field or upward into the lights.

Apart from the time a player is fielding high balls, anti-glare glasses for the eyes are not needed, and in fact may prove to be a hindrance to the player, due to the dimming of his view occasioned by the deep color of the filtering lenses.

In the past sunglasses comprising an eye-covering section or sun screen adapted to be swung optionally into, or out of, the line of vision of the wearer have been used by base-ball players. When the screen is raised to a horizontally extending position it is clear of the wearer's line of vision and the effect is the same as if no screen were being worn. At the same time the anti-glare lenses may be intentionally flipped down into the player's line of vision if the lighting conditions become too bright. Such prior anti-glare devices have usually been taken over from fields where the wearer was not doing much moving around, such as welders, automobile drivers, golfers and the like.

However in the case of base-ball players, the wearer often moves around quite violently, especially when fielding so-called ground balls, or catching balls at the bases. These being situations that normally require no anti-glare protection. However such rapid and jerky movements are often violent enough to cause the raised anti-glare lenses to fall over the wearer's eyes, dimming his view and impairing his visual judgment at a critical moment.

The primary object of this invention, therefore, is to provide sunglasses comprising an eye-covering section or sun screen adapted to be swung optionally into, or out of, the line of vision of the wearer, and to be rigidly held in such optional positions under the most severe conditions of shock and vibration.

Another object is to provide sunglasses of the type stated whose anti-glare lenses may be easily mounted thereon without requiring the use of any tools, and be as easily removed therefrom for replacement.

A further object is to provide a device of the type stated that is simple of construction, economical to manufacture, and the parts of which are capable of quick and easy assembly.

These and other objects of the invention will become apparent from a reading of the following specification and claims, together with the accompanying drawings, wherein:

FIGURE 3 is a cross-sectional view taken along the line and in the direction of the arrows 3—3 of FIGURE 2;

FIGURE 4 is a top plan view of a portion of the frame member at the lock spring element, with a part of the spring broken away to reveal the manner of its attachment to the frame;

FIGURE 5 is a front elevation of the spring taken along the line and in the direction of the arrows 5—5 of FIGURE 4;

FIGURE 6 is a front elevation of a portion of the swinging bracket showing one of its anti-glare lenses mounted therein;

FIGURE 7 is an exploded view of the anti-glare lens of FIGURE 6 with its mounting clip removed; and FIGURE 8 is an enlarged perspective view of the lens mounting clip.

Figure 1:
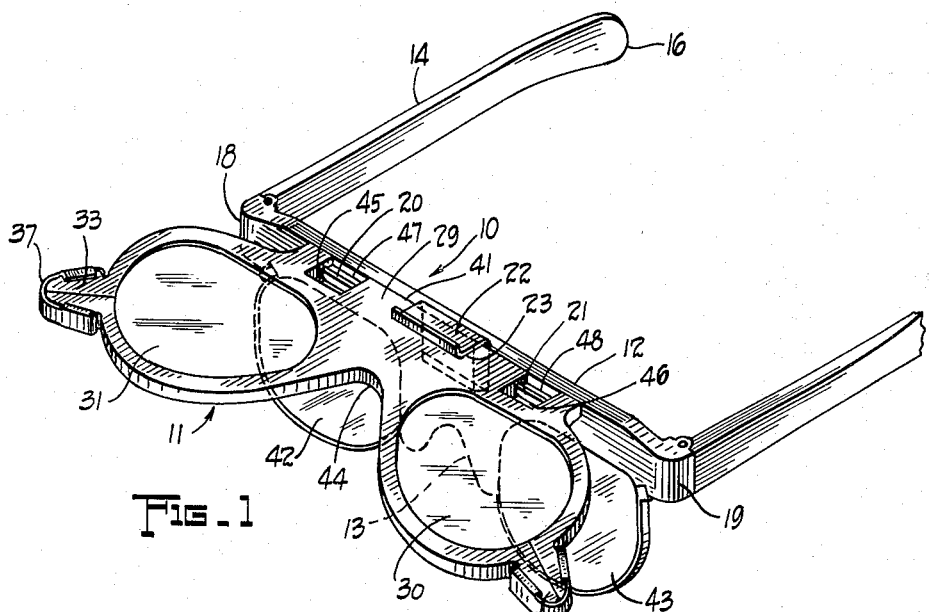
FIGURE 1 is a perspective view of the sunglasses which are the subject of this invention, showing the anti-glare lenses in their raised position, out of the line of vision of the wearer.
Figure 2:
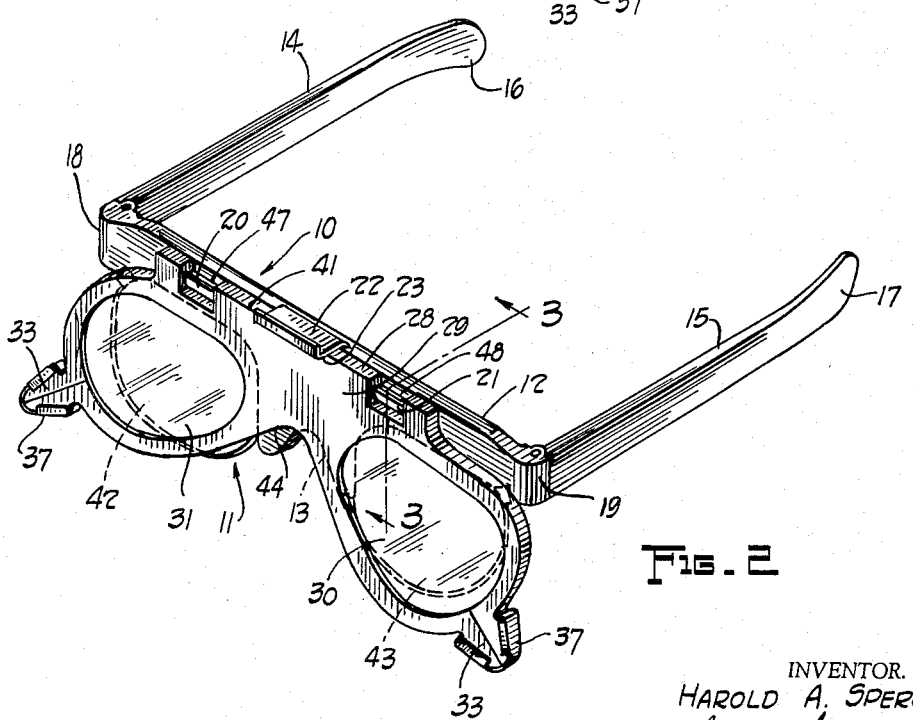
FIGURE 2 is a perspective view of the sunglasses illustrated in FIGURE 1, but with the anti-glare lenses now shown in their lowered position, in the line of vision of the wearer.

Referring more particularly to the drawing, there is seen in FIGURES 1 and 2 thereof the assembled sunglasses that are the subject of this invention.

Broadly speaking, the sunglasses comprise two major elements; a head engaging frame member 10, and an anti-glare lens supporting bracket 11 hingedly attached thereto, and swingable between locked alternate positions wherein the bracket 11 and contained anti-glare lenses 30 and 31 extend laterally of the frame 10 in a first horizontal position, out of the line of vision of the wearer, as seen in FIGURE 1; and then may be intentionally swung to a second, locked, dependent position, illustrated in FIGURE 2, wherein the anti-glare lenses are in the line of vision of the wearer.

The frame and bracket members, 10 and 11, respectively, may be fabricated from any suitable rigid plastic material, and in their preferred form are made of one of the so-called "nylon" plastics, because of their dimensional stability, toughness, and resistance to heat and moisture.

The frame 10 comprises a frontal piece 12 having a nose-engaging portion 13 formed integral therewith. Two temples 14 and 15 are hingedly attached to the frame ends at hinges 18 and 19, respectively. The temples 14 and 15 have terminal sections 16 and 17, respectively, designed to rest on the ears and grip the head of the wearer.

In some applications of the device, an elastic band, not illustrated, may be connected between the temple terminal sections 16 and 17, and stretched across the back of the head of the wearer to provide firmer anchorage for the frame 10.

Reference numerals 20 and 21 indicate two aligned and spaced sockets formed integral with the frame frontal piece 12, for a purpose to be hereinafter disclosed.

Reference numeral 22 indicates a flat spring anchored in a dove-tailed slot 26 in the front wall of the frontal piece 12, as is seen most clearly in FIGURES 4 and 5. Spring 22 has a vertical section 25 and a horizontal section 24. The vertical section 25 of the spring inter-fits the dove-tailed slot 26 and is locked therein by a peg 27 formed in the face of the slot and extending through a hole in the vertical section 25, so that once forced into place the resiliency of the spring 22 will prevent its removal. When so anchored on the frontal piece 2, the top section 24 extends in a horizontal plane forwardly of the frontal piece 12. The bracket member 11 has a plane front and rear faces 29 and 49, respectively, connected through a flat top edge 28 and a suitably curved bottom edge 44 shaped to outline the anti-glare lens 30 and 31, the tabs 33, and to clear the nose of the wearer. The top edge 28 abuts the front face 29 of the bracket 11 at a 90° angle.

Reference numerals 45 and 46 indicate two spaced notches formed in the top edge 28 of the bracket and adapted to receive the sockets 20 and 21 therein.

Reference numerals 47 and 48 indicate pintle pins formed integral with the bracket 11 and adapted to seat in the sockets 20 and 21, respectively. When the bracket 11 is so hingedly attached to the frame 10, the horizontal section 24 of the spring extends across the bracket 11 with its under face 23 in contact with the front face 24 of the bracket, as seen in FIGURE 1, when the bracket is in its raised position, and with the underface 23 in contact with the top edge 28, as seen in FIGURE 2, when the bracket is in its dependent position.

The bracket 11 has two openings cut therein to receive the anti-glare lens 30 and 31. Two tabs 33 are positioned at either end of the bracket adjacent to the lower edge of the lens. Each tab 33 is substantially triangular in shape with spaced notches 35 and 36 at its base end.

Reference numeral 34 indicates a slot which bisects the tab and intersects the lens opening. The so slit tab can be flexed slightly to permit the lens opening to be deformed enough to permit insertion of the lenses 30 and 31 which interfit grooves in said openings.

Reference numeral 37 indicates a spring clip shaped to the same outline as the tabs 33, having side retaining flanges 38 and terminal fingers 39 and 40.

After each lens is in position it is locked in place by sliding the clip 37 over the tab 33 so that the terminal fingers 39 and 40 of the clip seat in the tab notches 35 and 36, respectively, as seen most clearly in FIGURES 6, 7 and 8. It will be evident the mounting of the lens 30 and 31 is very simple, requiring no tools.

If the wearer requires corrective glasses, such lenses, indicated by reference numerals 42 and 43, may be attached to the frame 10 at either side of the nose piece 13 in any suitable manner. While the device has been shown with such corrective lenses in the drawing, it is to be understood that such lenses may be omitted if the wearer has normal vision.

In use the sunglasses are positioned on the wearer's face in the manner of conventional glasses with the nose piece 13 resting on the wearer's nose and the temple ends 16 and 17 resting on the ears.

In normal use when glare protection is not needed, the bracket 11 is in the position shown in FIGURE 1 wherein it extends outwardly of the frame 10 with its anti-glare lenses 30 and 31 out of the line of vision of the wearer, in this case indicated by the corrective lens 42 and 43.

It will be noted that in this position the under side 23 of the spring 22 is pressed against the front face 29 of the bracket 11 at its square edge 41. The bracket 11 cannot swing downward on its pintles 47 and 48 without causing its edge 41 to travel in a rising curve across the plane of the under side 23 of the spring 22. In order to do this, the horizontal section 24 of the spring 22 must be deformed upwardly. The stiffness of the spring 22 is intentionally calculated to be such that the bracket edge 41 cannot be rotated against the spring under-side 23 by any force originating on the frame side alone, that is, any reasonable force likely to be created by the sudden jerking or moving of the wearer's head, short of a force that will cause injury to the person of the wearer. However the bracket can be easily swung to its second position wherein the anti-glare lenses 30 and 31 are in the line of vision of the wearer's corrective lenses 42 and 43, as seen in FIGURES 2 and 3, by grasping the bracket tabs 33 and pulling downwardly until the underside 23 of the section 24 of the spring 22 rests on the top edge 28 of the bracket 11, as seen in FIGURE 3.

Again the bracket is held in its second, or dependent position, by the interaction of the spring 22 and the bracket edge 41. The so engaged anti-glare bracket cannot be unintentionally moved out of this eye-protective position, for the same reasons that it could not be unintentionally swung into such position, as set forth above.

It will now be clear that there has been provided a device which accomplishes the objectives heretofore set forth.

While the invention has been disclosed in its preferred form, it is to be understood that the specific embodiment thereof as described and illustrated herein is not to be considered in a limited sense, as there may be other forms or modifications of the invention which should also be construed to come within the scope of the appended claims.

I claim:

1. In spectacle frames of the type having two spaced and internally grooved lens retaining rims defining lens openings, a rim lock, comprising in combination, a substantially triangular tab formed integral with each rim and extending laterally of each of said lens openings, each of said tabs having a pair of opposed notches at its base end and a slit therebetween extending from the tab apex to the lens opening, defining two tab halves that can be flexed relative to each other to enlarge the lens opening, at the tab; a lens mounted in each of said lens openings in seated engagement within the groove thereof; and, a spring clip bent upon itself, having inwardly faced and opposed terminal fingers, adapted to compressively seat upon the periphery of the tab, with its terminal fingers seated in the tab notches, to compress the tab halves therebetween and thereby lock the lens within the lens opening.

2. Spectacles, comprising in combination, a frame member including temples operatively connected thereto; a bracket member having front and top faces joined through a square edge, tiltably mounted on the frame member and including anti-glare optical elements depending therefrom for optional movement into and out of the line of vision of the wearer, the top face of the bracket being in a horizontal plane, with the front face in a vertical plane, when the anti-glare elements are in a first, dependent position, in the line of vision of the wearer; and, a flat leaf spring mounted at one end on the frame member, extending outwardly therefrom in a horizontal plane above the bracket member, with its underside bearing flatly against the top face thereof, when the anti-glare elements are in their first position, to lock same in said position; the bracket member being manually tiltable on the frame to rotate its square edge in a rising arc against the downwardly presented bearing surface of the spring to raise and traverse said bearing surface and move the front face of the bracket into flat horizontal engagement with the underside of the spring, whereby the top face of the bracket is locked in a vertical plane, at 90° to the spring bearing surface, with the anti-glare elements in a second, raised position, extending outwardly of the frame in a horizontal plane above and clear of the line of vision of the wearer.

3. Spectacles, comprising in combination, a frame member including temples operatively connected thereto, the frame having a spring anchoring slot in the frontal piece thereof and two spaced sockets positioned on either side of said slot, the sockets having aligned bearing grooves, open to the top; a bracket member having front and top faces joined through a square edge, the bracket having spaced notches at the upper face thereof adapted to receive the frame sockets therein; a shaft positioned lengthwise of each of said notches and adapted to nest in the bearing grooves of the frame sockets when the sockets are fitted in said notches, whereby the bracket is tiltably suspended on the frame; an optical element mounted on and depending from the bracket member for optional movement into and out of the line of vision of the wearer, the top face of the bracket being in a horizontal plane, with the front face in a vertical plane, when the optical element is in a first, depending position, in the line of vision of the wearer; a flat leaf spring anchored in the frame slot and extending outwardly therefrom in a horizontal plane above the bracket member with its underside bearing flatly against the top face thereof, when the optical element is in its first position, to lock the bracket in said position and against removal from the frame sockets; the bracket member being manually tiltable in the frame sockets, on its shafts, to rotate its square edge in a rising arc against the downwardly presented bearing surface of the spring, to raise and traverse said bearing surface and move the front face of the bracket into flat horizontal engagement with the underside of the spring, whereby the top face of the bracket is locked in a vertical plane, at 90° to the spring bearing surface, with the anti-glare elements in a second, raised position, extending outwardly of the frame in a horizontal plane above and clear of the line of vision of the wearer.

References Cited in the file of this patent

UNITED STATES PATENTS

| | | |
|---|---|---|
| 308,344 | Collins | Nov. 25, 1884 |
| 2,367,389 | Ditto | Jan. 16, 1945 |
| 2,582,554 | Mendelsohn | Jan. 15, 1952 |
| 2,640,390 | Muncy | June 2, 1953 |
| 2,696,756 | Salierno | Dec. 14, 1954 |
| 2,923,943 | Rubin | Feb. 9, 1960 |